United States Patent

[11] 3,577,790

[72] Inventors Alexander John Munro Acomb;
John Francis Taplin, Croydon, England
[21] Appl. No. 865,307
[22] Filed Oct. 10, 1969
[45] Patented May 4, 1971
[73] Assignee Vickers Limited
London, England

[54] MECHANISMS FOR EFFECTING FINE AND COARSE ADJUSTMENT
4 Claims, 1 Drawing Fig.

[52] U.S. Cl. .................................................. 74/89.14
[51] Int. Cl. ................................................... F16h 29/20
[50] Field of Search ....................................... 74/89.14, 89.15, 424.8, 421, 425

[56] References Cited
UNITED STATES PATENTS
508,390   11/1893   Linkletter ..................... 74/89.14
1,524,069  1/1925   Watkinson et al. ........... 74/89.14
2,306,723 12/1942   Floraday ....................... 74/89.14
FOREIGN PATENTS
856,721  12/1960   Great Britain ................ 74/89.14

Primary Examiner—Fred C. Mattern, Jr.
Assistant Examiner—Wesley S. Ratliff, Jr.
Attorney—Waters, Roditi, Schwartz & Nissen ABSTRACT: A mechanism for effecting fine and coarse adjustment in which a first member is mounted for movement relatively to a second member. The mechanism includes two substantially mutually perpendicular shafts which are geared together and which are rotatable relatively to each other to effect said movement.

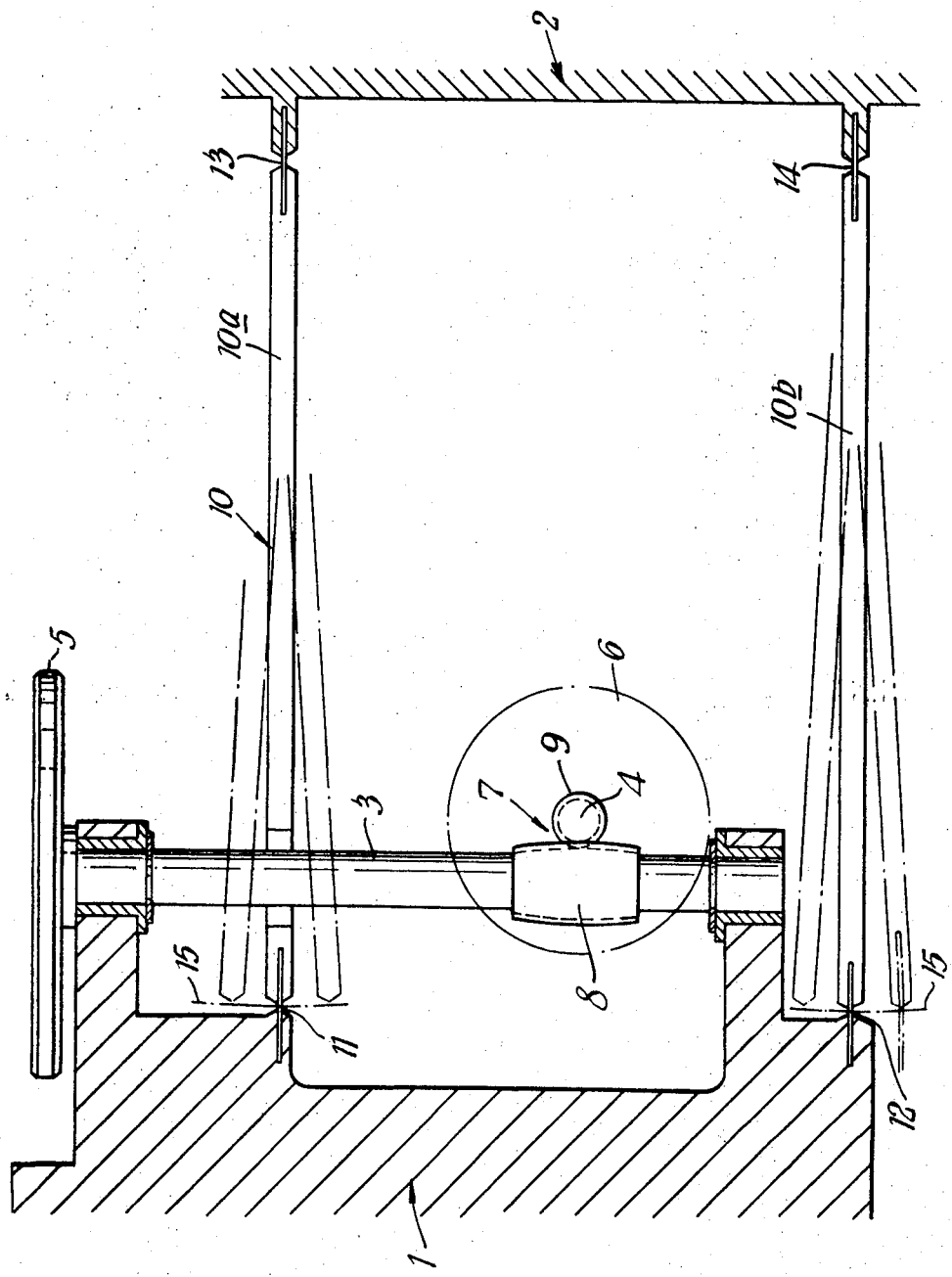

MECHANISMS FOR EFFECTING FINE AND COARSE ADJUSTMENT

BACKGROUND OF THE INVENTION

1. Field of the Invention

This invention relates to mechanisms for effecting fine and coarse adjustment and is more particularly but not exclusively concerned with mechanisms for effecting fine and coarse adjustment of microscopes.

SUMMARY OF THE INVENTION

According to the present invention there is provided a mechanism in which a first member is mounted for movement relatively to a second member and incorporating a device for effecting said movement, said device comprising first and second, substantially mutually perpendicular, shafts mounted on said first and second members respectively for rotation relatively to each other, with said first shaft being mounted for axial displacement relatively to said second shaft and a geared connection between said shafts whereby rotation of said first shaft effects fine adjustment of said first member, and rotation of said second shaft effects a coarse adjustment of said first member by producing in each case, axial displacement of the first shaft.

The geared connection between the first and second shafts may be constituted by a worm and wheel arrangement with the worm being formed on the first shaft and the worm wheel being formed on the second shaft.

In order to constrain the movement produced by the device, into a single path of adjustment, the members may be connected by parallel arms permitting bodily movement of the first member relatively to the second member. In this case the path traced by the moving system takes the form of a curve, so that for the teeth of the worm to remain in constant mesh with the teeth of the wheel, the worm is barrel-shaped with the pitch line of the worm teeth following a curve of a radius equal to that of the curved path traced by the connection point adjacent the first member of each arm.

Preferably the arms form part of a flexure hinge system.

BRIEF DESCRIPTION OF THE DRAWINGS

In order that the invention may be more fully understood an embodiment in accordance therewith will now be described, by way of example, with reference to the accompanying drawing which shows diagrammatically and in elevation a mechanism for effecting fine and coarse adjustment of a first member relatively to a second member.

DESCRIPTION OF PREFERRED EMBODIMENT

Referring to the drawing there is shown a mechanism in which a first member, generally indicated at 1 is mounted for movement relatively to a second member in the form of a fixed support bracket 2, the mechanism incorporating a device for effecting said movement including first and second substantially mutually perpendicular shafts 3 and 4 rotatably mounted in bearings in the first and second members respectively. The first and second shafts 3 and 4 are operable, for example manually, through control knobs 5 and 6 respectively and are geared together as indicated at 7, the geared connection 7 between the shafts 3 and 4 being such that rotation of the shaft 3 effects a fine adjustment of the member 1 and rotation of the shaft 4 effects a coarse adjustment of the member 1 by producing in each case axial displacement of the shaft 3.

The geared connection 7 is constituted by a worm and wheel arrangement with the worm 8 being formed on the shaft 3 and the wheel 9 being formed on the shaft 4.

In the preferred embodiment of the invention illustrated in the drawing, the movement of the member 1 produced by rotation of either of the shafts 3 and 4 by their respective control knobs 5 and 6 is constrained into a single substantially vertical path of movement by a flexure hinge system 10, which system pivotally connects the member 1 to the member 2, as at connection points 11, 12, 13 and 14. Preferably, to ensure stability of the mechanism, the system 10 is in the form of a hinged parallelogram incorporating parallel arms 10a and 10b interconnecting the members 1 and 2. As will be evident from the drawing the path of movement traced by any point on the flexure hinge system takes the form of a curve as indicated at 15 in broken lines.

Consequently the locus of any particle of the moving member 1 is a curve related to the centers of rotation of the flexure hinge system 10. Two positions of displacement of the system 10 by rotation of either of the shafts 3 and 4 are shown in broken lines on either side of an intermediate position shown in full lines.

As the shaft 3 is carried by the moving member 1, the locus of any point on the shaft 3 is a curve produced by the restraint of the flexure hinge system 10. Accordingly, in order that the teeth of the worm 8 are in constant mesh with the teeth of the wheel 9, during vertical movement of the member 1 with the shaft 3 the worm 8 is a barrel-shaped, as shown, so that the pitch line of the worm teeth follows a curve which is equal and opposite to that curve produced by the flexure hinge system 10 (i.e. the pitch line curve has a radius equal to that of the curved path traced by the connection points 11 and 12). Preferably, as shown, the worm teeth are formed by the cross section of a helical thread with the curved pitch line being substantially normal to the longitudinal axis of the shaft 3.

If the knob 6 is rotated through one complete turn the shaft 3 is moved axially along a curved path, the length of which equals the length of the pitch circumference of the wheel 9, to effect coarse adjustment. In order to effect fine adjustment, the knob 5 is rotated, the wheel remaining stationary whilst axial displacement of the shaft 3 obtains. One complete rotation of the knob 5 results in the shaft 3 moving axially by one tooth of the worm 8. It should be mentioned that the design of the gearing is such that rotation of the wheel 9 by the knob 6 does not produce rotation of the shaft 3. Furthermore rotation of the knob 5 for fine adjustment does not produce rotation of the wheel 9. Thus coarse and fine adjustment of the first member 1 relatively to the second member 2 are effected by producing axial displacement of the first shaft 3.

Purely by way of example, if the wheel 9 has 20 teeth, then 20 turns of the knob 5 will be equivalent to one turn of the knob 6.

By the present invention is provided a mechanism for fine and coarse adjustment of a first member relatively to a second member, which has particular application to microscopes in which the first member is constituted by the moving assembly of the microscope and the second member 2 by the microscope support bracket.

We claim:

1. A mechanism for effecting fine and coarse adjustment in which a first member is mounted for movement relatively to a second member and incorporating a device for effecting said movement, said device comprising:
    a. first and second, substantially mutually perpendicular, shafts mounted on said first and second members respectively for rotation relatively to each other, with said first shaft being mounted for axial displacement relatively to said second shaft, and
    b. a geared connection between said shafts whereby rotation of said first shaft effects a fine adjustment of said first member, and rotation of said second shaft effects a coarse adjustment of said first member by producing in each case, axial displacement of said first shaft.

2. A mechanism as set forth in claim 1, wherein said geared connection is constituted by a worm and wheel arrangement with the worm being formed on said first shaft and the worm wheel being formed on the second shaft.

3. A mechanism as set forth in claim 2, wherein said first and second members are connected by parallel arms permitting bodily movement of said first member relatively to said second member and the worm is barrel shaped with the worm teeth having a pitch line which follows a curve of a radius equal to that of a curved path traced by the connection point adjacent said first member of each arm.

4. A mechanism as set forth in claim 3, wherein the arms form part of a flexure hinge system.